United States Patent [19]
Oswald et al.

[11] 3,858,730
[45] Jan. 7, 1975

[54] FOUR-WHEEL DRIVE LIFT TRUCK

[75] Inventors: Norman Dean Oswald, Duncanville; Harry S. Mankey, Dallas, both of Tex.

[73] Assignee: Standard Manufacturing Company, Incorporated, Dallas, Tex.

[22] Filed: July 16, 1973

[21] Appl. No.: 379,597

[52] U.S. Cl.............. 214/1 D, 214/130 R, 180/44 F
[51] Int. Cl............................................. B66c 23/56
[58] Field of Search.......... 214/1 D, 1 H, 1 R, 77 R, 214/77 P; 180/44 F, 44 M, 49

[56] References Cited
UNITED STATES PATENTS

| | | | |
|---|---|---|---|
| 2,748,879 | 6/1956 | Bailey | 180/49 X |
| 3,087,630 | 4/1963 | Karnow et al. | 214/1 D |
| 3,484,004 | 12/1969 | Hughey | 214/1 D X |
| 3,727,774 | 4/1973 | Wolfe, Jr. | 214/1 D |

FOREIGN PATENTS OR APPLICATIONS

| | | | |
|---|---|---|---|
| 506,743 | 10/1954 | Canada | 180/49 |
| 784,436 | 10/1957 | Great Britain | 180/49 |

*Primary Examiner*—Frank E. Werner
*Attorney, Agent, or Firm*—Richard, Harris & Medlock

[57] ABSTRACT

A lift truck comprises a frame and a prime mover mounted at the extreme rear end of the frame. The prime mover drives a hydrostatic drive assembly which in turn drives a pair of rear wheels. Drive mechanisms extend along each side of the frame to drivingly interconnect each rear wheel and a steerable front wheel situated on the same side of the frame. The front wheels are mounted on spaced apart arms of a forwardly extending U-shaped portion of the frame, and an article lifting assembly is mounted on the frame for manipulation in the open space between the arms. In one embodiment of the invention the drive mechanisms for the front wheels comprise chain and sprocket drives, and in another embodiment the drive mechanisms comprise gearsets and drive shafts. The hydrostatic drive assembly may comprise either a pump and a hydraulic motor connected to the rear wheels through a differential, or a pump and two motors each connected to one of the rear wheels.

8 Claims, 7 Drawing Figures

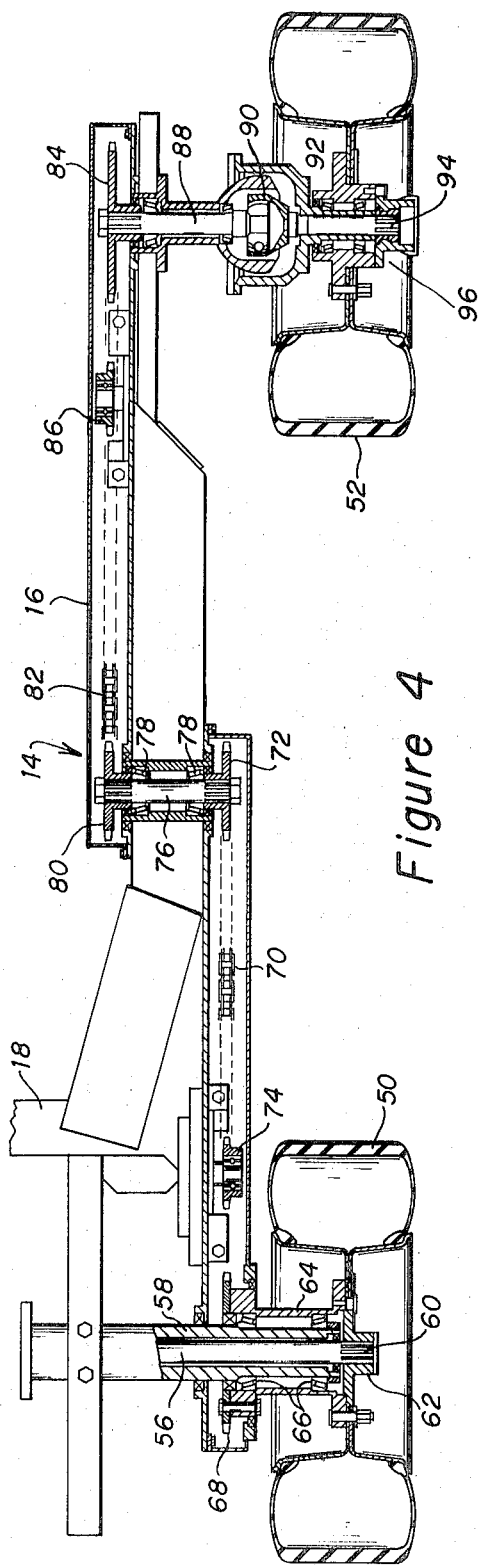
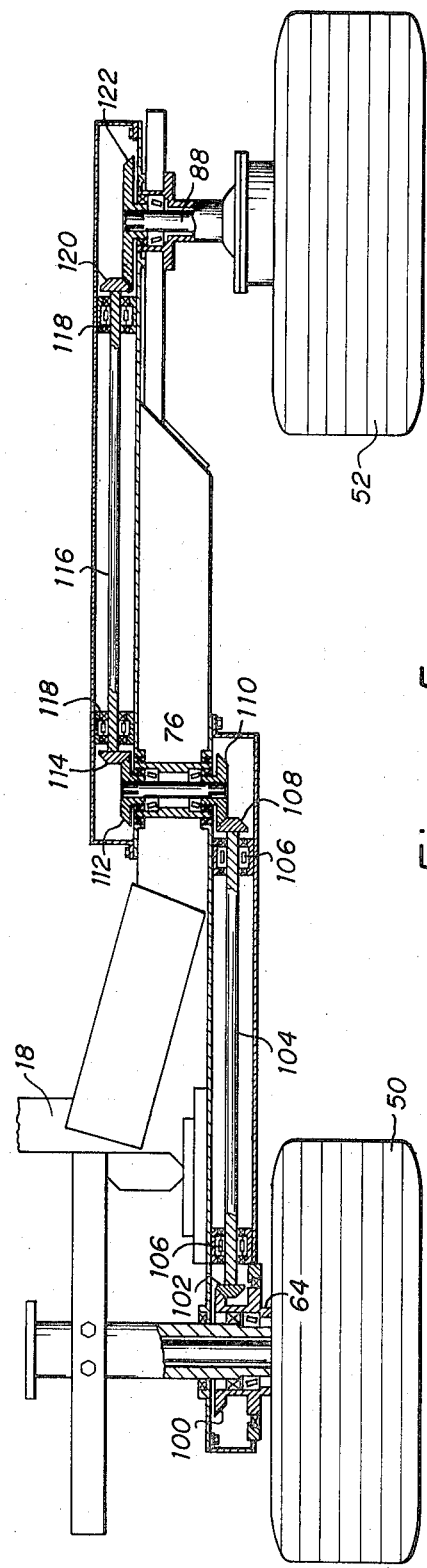
Figure 4
Figure 5

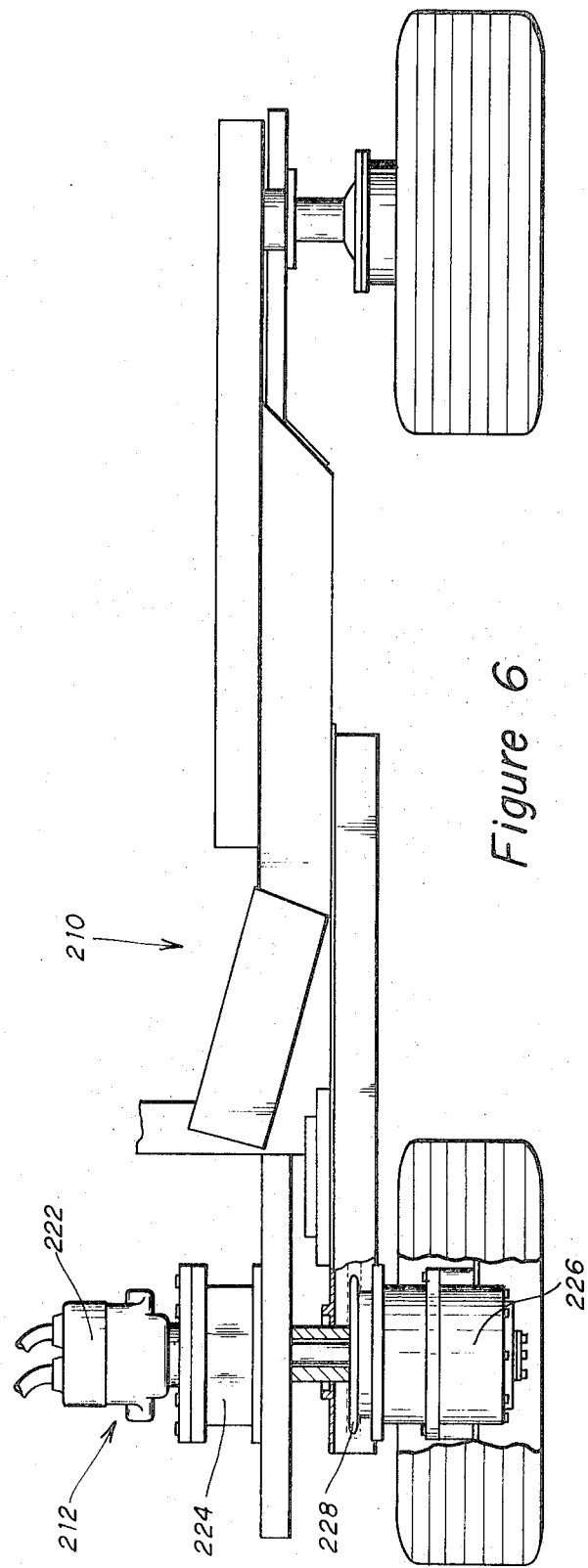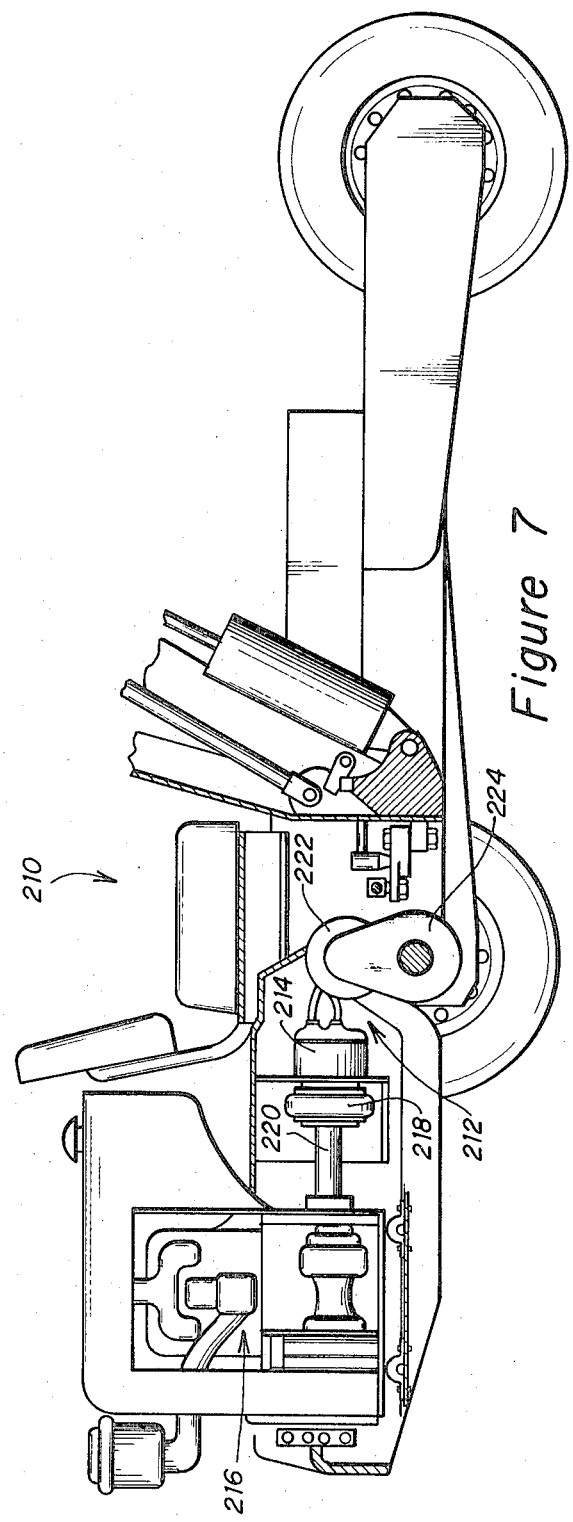

FOUR-WHEEL DRIVE LIFT TRUCK

BACKGROUND AND SUMMARY OF THE INVENTION

This invention relates to a four-wheel drive lift truck, and more particularly to an all-terrain vehicle adapted for handling aerial weapons.

The handling of aerial weapons such as bombs, rockets, and the like involves a number of considerations which are not typically encountered in conventional material handling operations. For example, it is often necessary to lift an aerial weapon through a considerable distance in order to position the weapon for attachment to an aircraft. Second, highly accurate positioning is required in order to align the lugs of an aerial weapon with the corresponding lugs of an aircraft. Finally, vehicles adapted for handling weapons must be extremely maneuverable in order to function satisfactorily in crowded conditions as are encountered in and around aircraft storage facilities.

In accordance with the foregoing requirements, vehicles designed to handle aerial weapons have traditionally comprised a rear mounted engine adapted to propel the vehicle by means of the rear wheels only. In many instances steering is also effected by means of the rear wheels. Lift trucks of this type often comprise front wheels mounted on a pair of forwardly projecting arms. A boom is provided for manipulation within the space between the forwardly extending arms. Aerial weapons are actually received and manipulated by a lift table secured to the distal end of the boom.

While performing adequately the intended function of aerial weapons handling, the foregoing type of aerial weapons handling vehicle also exhibits a number of serious drawbacks. First, such vehicles are often prohibitively expensive to purchase, particularly when they are equipped with mechanical transmissions for interconnecting the engine and the rear drive wheels. Perhaps more importantly, such devices have typically not been highly maneuverable. This has necessitated the use of lift tables incorporating as many as six types of motion, i.e., both linear movement and rotation about three mutually perpendicular axes.

The co-pending application of Maston B. Wolfe, Jr., Ser. No. 68,679, filed Sept. 1st, 1970, now U.S. Pat. No. 3,727,774, discloses a lift truck which overcomes many of the foregoing difficulties. Thus, an important feature of the prior Wolfe invention comprises the use of a hydrostatic drive to drivingly interconnect a rear mounted engine and rear drive wheels. By this means the overall cost of the vehicle is materially reduced. Perhaps more importantly, the device disclosed in the Wolfe Patent is adapted for manipulation by means of front wheel steering. It has been found that front wheel steering provides such improved maneuverability that it is often possible to handle aerial weapons by means of much simpler and less expensive lift tables than has been possible heretofore.

The lift truck disclosed in the above-identified Wolfe Patent has proven to be entirely satisfactory for use on conventional hard, smooth surfaces such as runways, hanger decks, and the like. However, there is presently an increasing interest in vehicles for handling aerial weapons which are capable of operating over adverse terrain. This trend is partially the result of the military situation around the world which often necessitates the servicing of aircraft from locations wherein conventional hard, smooth surfaces are not provided. Also, it is often necessary to construct aircraft service facilities on a relatively rapid basis, in which case it may be impossible to provide the type of hard, smooth surface which is necessary in the use of the prior art aerial weapons handling apparatus.

The present invention comprises a lift truck for handling aerial weapons whereby the advantages heretofore derived from the use of the above-described Wolfe invention are incorporated in an all-terrain vehicle. In accordance with the broader aspects of the invention, a lift truck comprises a rear mounted engine which actuates a pair or rear wheels by means of a hydrostatic drive. A pair of steerable front wheels are supported on forwardly extending, spaced apart arms. A boom is provided for manipulation in the space between the arms, and a lift table is mounted on the distal end of the boom. The vehicle is adapted for operation over adverse terrain by means of drive connections extending forwardly from each rear wheel along the associated forwardly extending arm to the front wheel on the same side of the vehicle.

Two embodiments of the invention are disclosed. In accordance with one embodiment the drive connections comprise chain drives. That is, the rear wheel on one side of the vehicle is provided with a drive sprocket and a first chain extends forwardly therefrom to a second sprocket mounted on a cross shaft. The cross shaft drives a third sprocket, and a second chain extends forwardly from the third sprocket to a fourth sprocket which is connected to the front wheel on the same side of the vehicle. Each front wheel is equipped with a lockout hub, whereby the vehicle may be driven by means of the rear wheels only.

In accordance with the other embodiment of the invention, the drive connections on each side of the vehicle comprise gears and drive shafts extending therebetween. That is, each rear wheel drives a first bevel gear which is mounted in mesh with a bevel gear supported on a first forwardly extending drive shaft. The first drive shaft operates a cross shaft by means of a second gearset, and the cross shaft drives a second forwardly extending drive shaft by means of a third gearset. The second drive shaft is connected to the front wheel on the same side of the vehicle by means of a fourth gearset.

The hydrostatic drive of the lift truck may also take different forms. Thus, in accordance with one modification of the invention, the hydrostatic drive comprises a hydraulic pump driven by the engine, and a hydraulic motor driven by the hydraulic pump and connected to the rear wheels of the vehicle by means of an automotive-type differential. In accordance with another modification of the invention, the hydrostatic drive comprises a hydraulic pump driven by the engine and two hydraulic motors both driven by the hydraulic pump and each connected to one of the rear wheels of the vehicle.

DESCRIPTION OF THE DRAWINGS

A more complete understanding of the invention may be had by referring to the following Detailed Description when taken in conjunction with the accompanying Drawings, wherein:

FIG. 4 is a partial sectional view of a drive mechanism incorporating a first embodiment of the invention;

FIG. 5 is a partial sectional view of a drive mechanism incorporating a second embodiment of the invention;

FIG. 6 is a partial sectional view of a four-wheel drive lift truck incorporating the invention and equipped with an alternative hydrostatic drive apparatus; and FIG. 7 is a partial sectional view further illustrating the alternative hydrostatic drive apparatus of FIG. 6.

DETAILED DESCRIPTION

Figure 3:
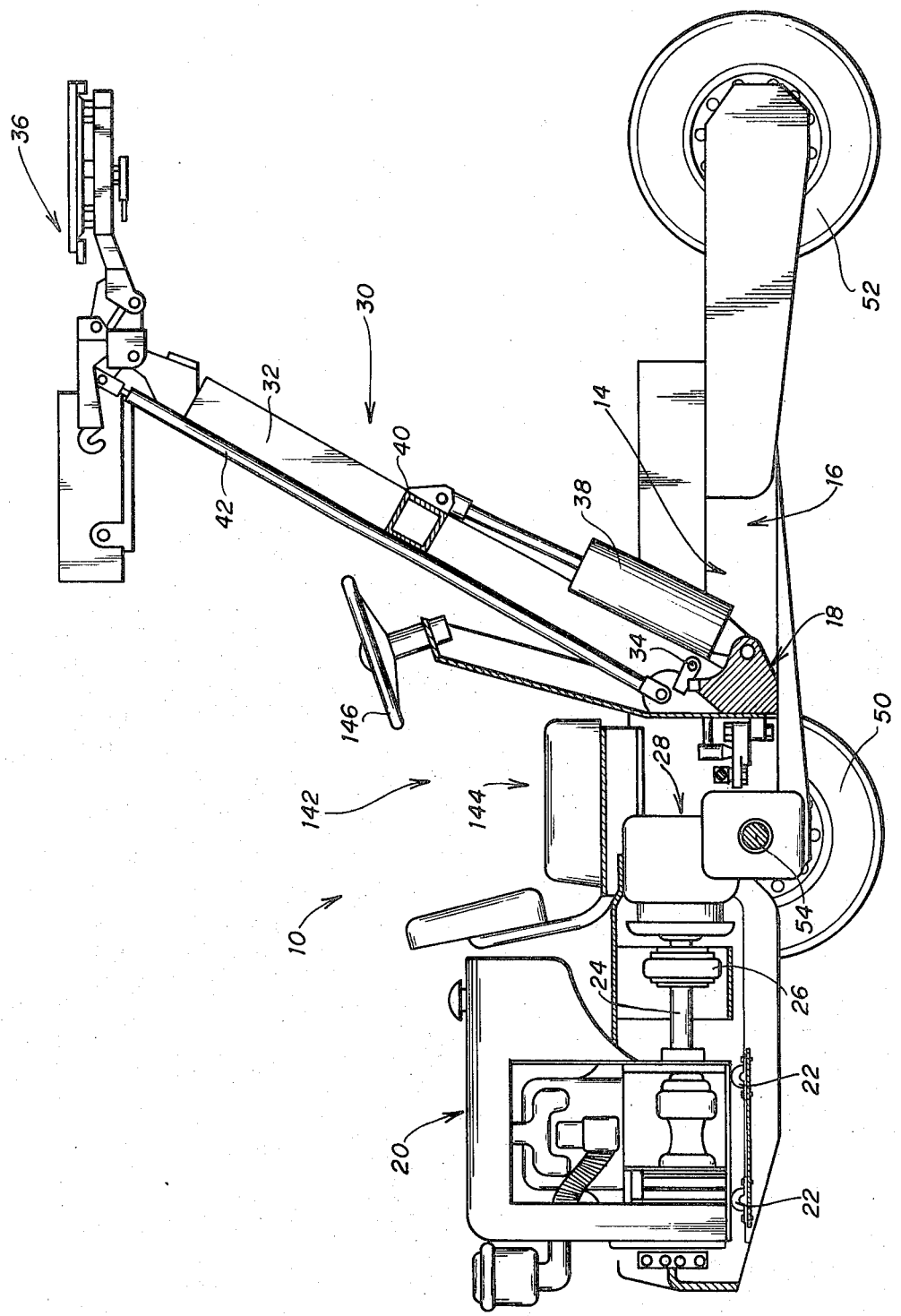
FIG. 3 is a reversed partial sectional view of the lift truck.

Referring now to the Drawings, there is shown a four-wheel drive lift truck 10 incorporating the present invention. The lift truck 10 includes a frame 12 which extends the entire length of the lift truck, and which supports the various operating components thereof. As is best shown in FIG. 3, the frame 12 of the lift truck 10 includes a U-shaped portion 14 comprising a pair of spaced apart, longitudinally extending, generally parallel arms 16 and a base 18 interconnecting the arms 16.

A prime mover 20 is supported at the extreme rear end of the frame 12 and functions to supply operating power for all the component parts of the lift truck 10. The particular prime mover 20 illustrated in the Drawings comprises an internal combustion engine of the type manufactured by the Wisconsin Motor Corporation of Milwaukee, Wis. It will be understood however, that the prime mover 20 may also comprise a deisel engine, an electric motor, etc., if desired.

The prime mover 20 is supported on the rear portion of the frame 12 by means of a plurality of shock mounts 22. The prime mover functions to drive an output shaft 24 which is coupled to a conventional flexible coupling 26. The flexible coupling 26 is in turn coupled to a hydrostatic drive unit 28 which may be of the type manufactured by Eaton, Yale & Towne, Inc., Eaton Marshall Division, of Marshall, Michigan. The hydrostatic drive unit 28 may also comprise various other commercially available hydrostatic drive units, or may be specially manufactured for use in the lift truck 10, if desired.

The lift truck 10 further includes an article lifting mechanism 30 which is supported on the base 18 of the U-shaped portion 14 of the frame 12 just forwardly of the hydrostatic drive unit 28. The mechanism 30 includes a pair of booms 32 which are pivotally connected to the frame 12 and which extend to an article receiving and supporting assembly 36. A hydraulic cylinder 38 is connected between the frame 12 and a cross beam 40 extending between the booms 32 and is therefore adapted for selective actuation to raise and lower the article lifting mechanism 30 relative to the frame 12 of the lift truck 10. During such operations, a pair of tension rods 42 operate with the booms 32 to maintain a predetermined orientation of the article receiving and supporting assembly 36.

Figure 1:
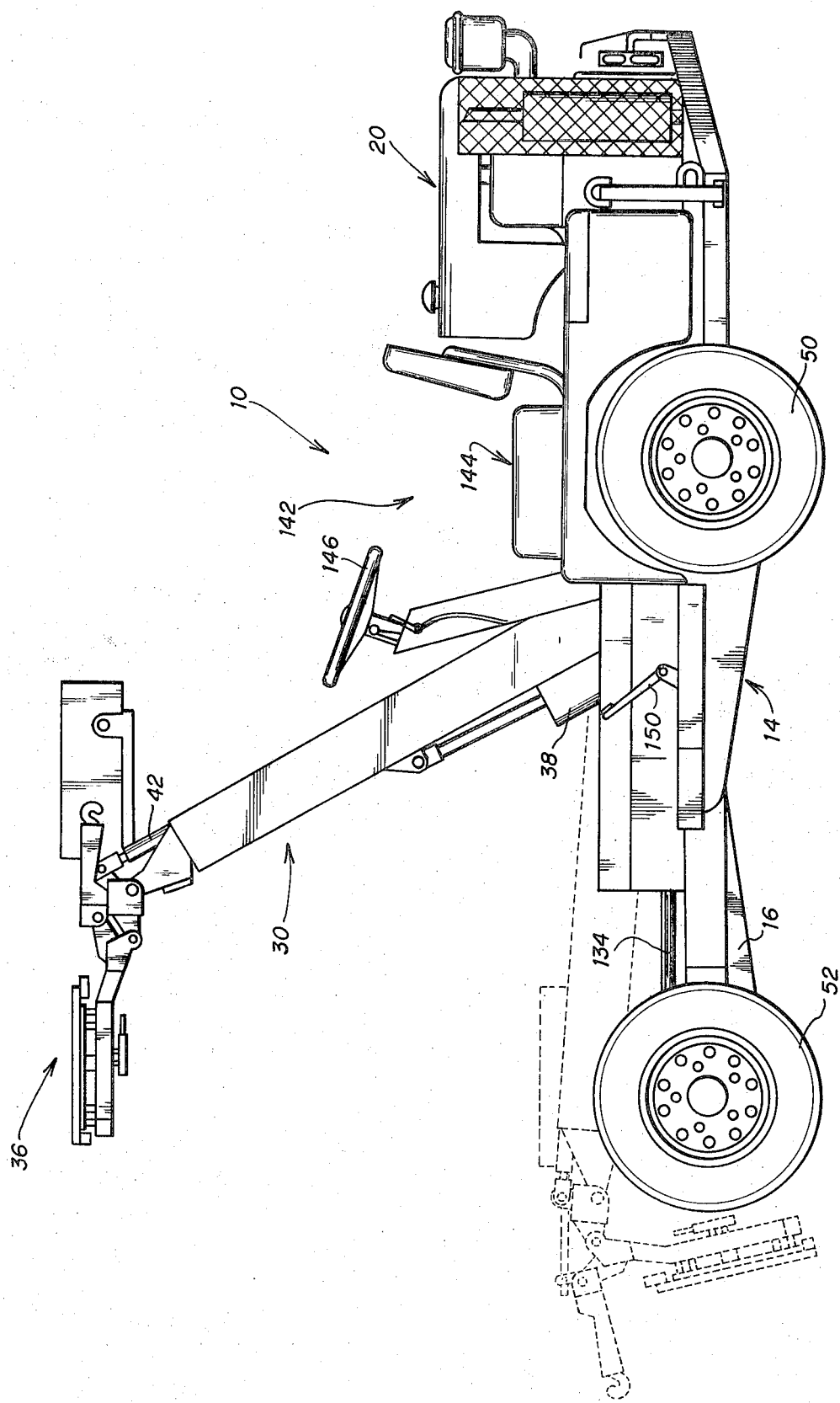
FIG. 1 is a side view of a four wheel drive lift truck incorporating the invention.

The article receiving and supporting assembly 36 of the article lifting mechanism 30 may comprise conventional lift forks, a conventional lift table of the type heretofore used for manipulating aerial weapons, etc. The particular article receiving and supporting assembly 36 illustrated in the Drawings comprises a lift table of the type comprising the subject matter of the application of Maston B. Wolfe, Jr., Ser. No. 61,230, filed Aug. 5th, 1970, now U.S. Pat. No. 3,727,773, the disclosure of which is incorporated herein by reference. Such a lift table is adapted to manipulate aerial weapons and the like so as to align the lugs of the weapons with the corresponding lugs of aircraft, and is also adapted to receive aerial weapons directly from the ground or other surfaces in the manner illustrated in dashed lines in FIG. 1.

Figure 2:
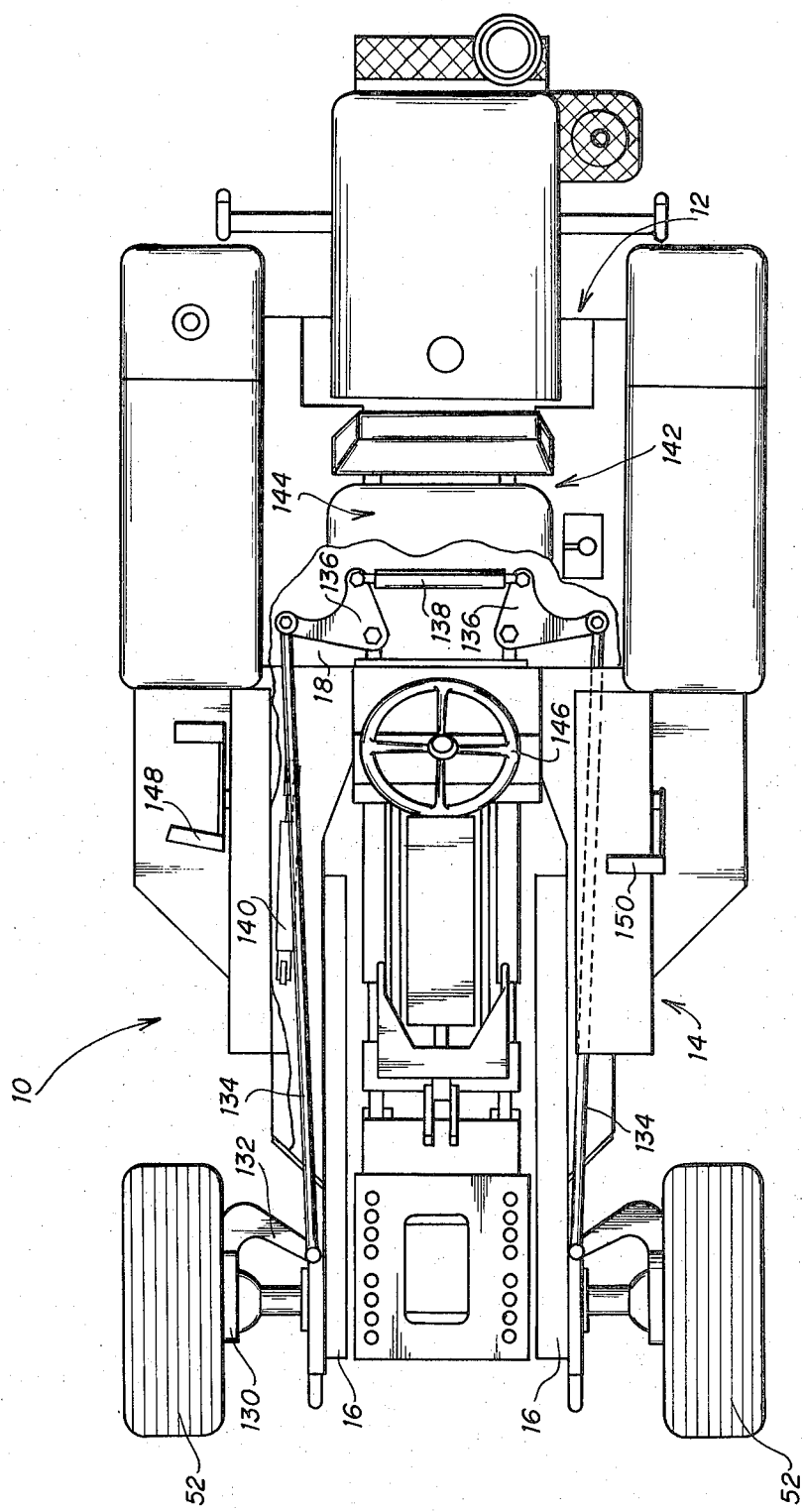
FIG. 2 is a top view of the lift truck.

Referring again to FIG. 2, the frame 12 of the lift truck 10 is supported by two rear wheels 50 positioned in alignment with the hydrostatic drive unit 28 and two front wheels 52 supported at the front ends of the forwardly extending arms 16 of the U-shaped portion 14 of the frame 12. The hydrostatic drive unit 28 comprises opposed outputs 54. As is best shown in FIGS. 4 and 5, each output 54 of the hydrostatic drive unit 28 is coupled to the rear wheel 50 on one side of the lift truck 10 by means of a shaft 56 extending through a cylindrical housing 58. A spline portion 60 is formed on the outboard end of each shaft 56 and each wheel 50 is provided with a mating internally splined portion 62, whereby each rear wheel 50 of the lift truck 10 is operatively connected to its associated shaft 56 and hence to the hydrostatic drive unit.

By means of the present invention, the front wheel 52 on each side of the lift truck 10 is drivingly connected to the rear wheel 50 on the same side of the lift truck. In accordance with the embodiment of the invention shown in FIG. 4, a cylinder 64 is connected to each rear wheel 50 and is rotatably supported on the associated housing 58 by a pair of bearings 66. A first sprocket 68 is in turn connected to each cylinder 64.

A first chain 70 extends around each first sprocket 68 and an aligned second sprocket 72. An idler sprocket 74 is provided for maintaining the required tension in the first chain 70. The second sprocket 72 is secured to a cross shaft 76 which is rotatably supported in one of the forwardly extending arms 16 of the U-shaped portion 14 of the frame 12 by a pair of bearings 78. Each cross shaft 76 functions to interconnect the associated second sprocket 72 and a third sprocket 80.

A second chain 82 extends around each third sprocket 80 and an aligned fourth sprocket 84. An idler sprocket 86 is provided for maintaining the required tension in the second chain 82. The fourth sprocket 84 is coupled to a shaft 88 extending to a ball joint 90. The purpose of the ball joint 90 is to permit actuation of the front wheels 52 to effect steering of the lift truck 10.

Each ball joint 90 is provided with an output shaft 92 extending to a splined portion 94 at the outboard end. The splined portions 94 of the shafts 92 receive mating splined portions of conventional lockout hubs 96 which are in turn connected to the front wheels 52. By this means the front wheels 52 may be disengaged from the drive train of the lift truck 10, if desired. It will be understood that when the lockout hubs 96 are disengaged, the lift truck 10 is propelled solely by means of the rear wheels 50.

A second embodiment of the invention is illustrated in FIG. 5. In accordance with the second embodiment, a first bevel gear 100 is connected to the cylinder 64 for rotation therewith. The gear 100 is mounted in mesh with a second bevel gear 102 which is connected to one end of a first drive shaft 104. The shaft 104 is rotatably supported in bearings 106, and a third bevel gear 108 is connected to the opposite end of the shaft 104.

The gear 108 drives a meshing bevel gear 110 connected to the cross shaft 76. A fifth bevel gear 112 is connected to the opppsite end of the cross shaft 76 and meshes with a bevel gear 114 connected to a second drive shaft 116. The shaft 116 is rotatably supported in bearings 118 and extends to a seventh bevel gear 120. The gear 120 is mounted in mesh with a gear 122 connected to the shaft 88. The shaft 88 in turn drives the associated front wheel 52 by means of a lockout hub.

It will thus be understood that in accordance with both embodiments of the invention, drive trains are provided along the opposite edges of the frame 12 of the lift truck 10, whereby the front wheels 52 of the lift truck are selectively drivingly interconnected to the rear wheels 50 thereof. An important feature of the invention relates to the fact that in accordance with both embodiments thereof, the drive trains are totally enclosed and protected by housing sections 124 secured to the frame 12 of the lift truck 10. This is important not only from a safety standpoint, but also by way of preventing damage to the component parts of the drive trains due to accumulations of dirt, etc. If desired, further protection for the component parts of the drive trains may be provided by filling the housing sections 124 with grease, etc.

The steering system for the lift truck 10 is illustrated in FIG. 3. Each front wheel 52 comprises an inner hub 130 having an arm 132 extending inwardly therefrom. A pair of tie rods 134 are each pivotally connected to one of the arms 132 and extend rearwardly therefrom generally parallel to the forwardly extending arms 16 of the U-shaped portion 14 of the frame 12. The tie rods 134 are in turn pivotally connected to a pair of bell cranks 136 which are pivotally supported in the base 18 of the U-shaped portion of the frame. A transversely extending tie rod 138 is pivotally connected at its opposite ends to the two bell cranks 136.

The foregoing linkage functions to maintain a parallel relationship between the two front wheels 52 of the lift truck 10. A hydraulic cylinder 140 is connected between the frame 12 of the lift truck and one of the tie rods 134. The hydraulic cylinder 140 is therefore adapted for selective actuation to regulate the orientation of the wheels 52 and thereby effect steering of the truck 10.

The lift truck 10 further includes an operator's compartment 142 situated in front of the prime mover 10, directly over the hydrostatic drive unit 28, and behind the point of attachment of the article lifting mechanism 30 to the frame 12 of the lift truck. The operator's compartment 142 includes a seat 144 and various controls adapted for selective actuation to control the operation of the various components of the lift truck 10. In particular, the operator's compartment 142 includes a steering wheel which is operatively connected to a steering control valve 147 of the type manufactured by the Chr-Lyn Company of Minneapolis, Minn. The steering control valve is adapted to regulate the flow of hydraulic fluid from the charge pump of the hydrostatic drive unit 28 to the hydraulic cylinder 140, whereby manipulation of the steering wheel 146 is effected to control the orientation of the front wheels 52 and hence the steering of the lift truck 10.

The operator's compartment 142 further includes a pair of foot pedals 148 and 150. The foot pedal 148 is operable to regulate the hydrostatic drive unit 28 of the lift truck 10, that is, manipulation of the foot pedal 148 is effective to control both the direction and the speed of operation of the lift truck. On the other hand, the foot pedal 150 functions to control suitable brakes (not shown). It should be noted, however, that during normal operation of the lift truck 10, actuation of the brakes is not necessary since substantially complete control over the operation of the vehicle may be provided by means of the foot pedal 148 and the hydrostatic drive unit regulated thereby.

An important feature of the invention relates to the fact that an entirely open area is provided between the forwardly extending arms 16 of the U-shaped portion 14 of the frame 12 of the lift truck 10. That is, the portions of the frame of the vehicle extending to the front wheels 52, the linkage for manipulating the front wheels to effect steering of the vehicle, and the mechanism for drivingly connecting the front wheels to the rear wheels all extend along the opposite sides of the lift truck, whereby an entirely open area at the front end of the lift truck is provided. The article lifting mechanism 30 is adapted for manipulation within this entirely open area, whereby the handling of aerial weapons by the lift truck 10 is greatly facilitated. It should be noted in this regard that because the article lifting mechanism 30 is situated for manipulation in the entirely open area, aerial weapons may be supported as shown in full lines in FIG. 1 during attachment to the lugs of an aircraft. When the aerial weapon is so located, the overall center of gravity of the lift truck and the weapon is situated between the front wheels 52 and the rear wheels 50, thereby greatly adding to the stability of the lift truck during weapon attachment operations.

Those skilled in the art will appreciate the fact that the hydrostatic drive unit 28 utilized in the four-wheel drive lift truck 10 illustrated in FIGS. 1–4 comprises a commercially available unit which is entirely self-contained. Within the hydrostatic drive unit 28 there is provided a hydraulic pump which is driven directly by the prime mover 20 of the lift truck 10. The output of the hydraulic pump is directed to a hydraulic motor and the speed and direction of operation of the lift truck 10 are controlled by regulating the flow of hydraulic fluid between the pump and the motor. The hydraulic motor is in turn operatively connected to the rear wheels 50 of the lift truck by means of an automotive-type differential.

Referring to FIGS. 6 and 7, there is shown a four-wheel drive lift truck 210 which is substantially identical in construction and operation to the lift truck 10 illustrated in FIGS. 1–4, but which incorporates an entirely different hydrostatic drive apparatus 212. As is best shown in FIG. 7, the hydrostatic drive apparatus 212 includes a hydraulic pump 214 which is operatively connected to a prime mover 216 by means of a flexible coupling 218 and a drive shaft 220. Pressurized hydraulic fluid flowing from the pump 214 is directed to a pair of hydraulic motors 222 (only one of which is shown).

Each hydraulic motor 222 is connected to one of the rear wheels 50 of the lift truck by means of a stepdown 224. The purpose of the stepdown 224 is both to provide speed reduction and to permit mounting of the motor 222 at a point substantially above the axis of the rear wheels 50. Each stepdown 224 is in turn connected to a rear wheel 50 by means of a planetary hub 226. Each planetary hub 226 is provided with a sprocket 228 so constructed as to rotate with its associated rear wheel 50. By this means the hydrostatic drive apparatus 212 is operatively connected to a chain drive arrangement which is substantially identical to that illustrated in FIG. 4.

It will therefore be understood that the present invention comprises a lift truck adapted for handling aerial weapons which incorporates numerous advantages over the prior art. Thus, by means of the invention, the high degree of maneuverability heretofore associated with rear wheel drive — front wheel steering lift trucks is combined with the all-terrain capability of four-wheel drive lift trucks. Advantageously these features are obtained without sacrificing the superior weapons handling characteristics that have traditionally been associated with lift trucks comprising an entirely open area between the forwardly extending portions of the frame.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A lift truck comprising:
    a frame including a forward U-shaped portion comprising a pair of substantially parallel, longitudinally extending arms and a transversely extending base interconnecting the rear ends of the arms;
    a pair of front steering wheels mounted at the front ends of the arms of the U-shaped portion of the frame for supporting the front end of the lift truck;
    a linkage including portions extending along the arms and a portion extending along the base of the U-shaped portion of the frame for maintaining the steering wheels in a parallel relationship with respect to the frame;
    a prime mover mounted on the frame to the rear of the base of the U-shaped portion thereof;
    transmission means operatively connected to the prime mover;
    a pair of non-steerable rear wheels operatively connected to the transmission means and hence to the prime mover for actuation thereby;
    drive means extending along each side of the frame for selectively drivingly coupling the rear wheel on each side of the lift truck to the front wheel on the same side of the lift truck so that the lift truck is propelled by means of both the rear wheels and the front wheels;
    said drive means on each side of the frame comprising a chain and sprocket drive including:
    a first sprocket mounted for rotation with one of the rear wheels;
    a cross shaft comprising interconnected second and third sprockets;
    a first chain extending around the first and second sprockets;
    a fourth sprocket operatively connected to the front wheel on said one side of the frame; and
    a second chain extending around third and fourth sprockets;
    the U-shaped portion of the frame, the front steering wheels, the linkage and the drive means thereby defining an entirely opened area between the arms of the U-shaped portion of the frame;
    a boom pivotally supported on the base of the U-shaped portion of the frame for vertical manipulation in said open area; and
    an operating compartment positioned on the frame to the rear of the base of the U-shaped portion thereof and including means for manipulating the linkage to control the orientation of the front steering wheels.

2. The lift truck according to claim 1 wherein at least a portion of the drive means extending along each side of the frame extends through and is enclosed by housing means comprising portions of the frame of the lift truck.

3. The lift truck according to claim 1 wherein the transmission means comprises hydrostatic drive means including hydraulic pump means driven by the prime mover, hydraulic motor means operatively connected to the output of the hydraulic pump means, and means drivingly connecting the rear wheels of the lift truck to the hydraulic motor means.

4. The lift truck according to claim 3 wherein the hydraulic motor means comprises dual hydraulic motors each having an output connected to one of the rear wheels.

5. A lift truck comprising:
    a frame including a forward U-shaped portion comprising a pair of substantially parallel, longitudinally extending arms and a transversely extending base interconnecting the rear ends of the arms;
    a pair of front steering wheels mounted at the front ends of the arms of the U-shaped portion of the frame for supporting the front end of the lift truck;
    a linkage including portions extending along the arms and a portion extending along the base of the U-shaped portion of the frame for maintaining the steering wheels in a parallel relationship with respect to the frame;
    a prime mover mounted on the frame to the rear of the base of the U-shaped portion thereof;
    transmission means operatively connected to the prime mover;
    a pair of non-steerable rear wheels operatively connected to the transmission means and hence to the prime mover for actuation thereby;
    drive means extending along each side of the frame for selectively drivingly coupling the rear wheel on each side of the lift truck to the front wheel on the same side of the lift truck so that the lift truck is propelled by means of both the rear wheels and the front wheels;
    said drive means on each side of the frame comprising:
    a gear mounted for rotation with one of the rear wheels;
    a cross shaft comprising interconnected gears;
    a first drive shaft having gears at its opposite ends mounted in mesh with the gear of the rear wheels and one of the gears of the cross shaft;
    a gear operatively connected to the front wheel on the same side of the lift truck as the rear wheel; and
    a second drive shaft having gears at its opposite ends mounted in mesh with the other gear of the cross shaft and the gear of the front wheel;
    the U-shaped portion of the frame, the front steering wheels, the linkage and the drive means thereby defining an entirely opened area between the arms of the U-shaped portion of the frame;

a boom pivotally supported on the base of the U-shaped portion of the frame for vertical manipulation in said open area; and an operating compartment positioned on the frame to the rear of the base of the U-shaped portion thereof and including means for manipulating the linkage to control the orientation of the front steering wheels.

6. The lift truck according to claim 5 wherein at least a portion of the drive means extending along each side of the frame extends through and is enclosed by housing means comprising portions of the frame of the lift truck.

7. The lift truck according to claim 5 wherein the transmission means comprises hydrostatic drive means including hydraulic pump means driven by the prime mover, hydraulic motor means operatively connected to the output of the hydraulic pump means, and means drivingly connecting the rear wheels of the lift truck to the hydraulic motor means.

8. The lift truck according to claim 7 wherein the hydraulic motor means comprises dual hydraulic motors each having an output connected to one of the rear wheels.

* * * * *